(12) United States Patent
Higashi et al.

(10) Patent No.: US 7,867,431 B2
(45) Date of Patent: Jan. 11, 2011

(54) METHOD OF AND APPARATUS FOR MAKING A THREE-DIMENSIONAL OBJECT (75) Inventors: Yoshikazu Higashi, Moriyama (JP); Hirohiko Togeyama, Tondabayashi (JP); Satoshi Abe, Moriguchi (JP); Isao Fuwa, Osaka (JP); Seiichi Tomita, Fukui (JP); Toshio Maeda, Fukui (JP); Norio Takinami, Fukui (JP)

(73) Assignees: Matsuura Machinery Corporation, Fukui (JP); Panasonic Electric Works Co., Ltd., Osaka (JP)

( * ) Notice: Subject to any disclaimer, the term of this patent is extended or adjusted under 35 U.S.C. 154(b) by 966 days.

(21) Appl. No.: 11/569,261

(22) PCT Filed: May 25, 2005

(86) PCT No.: PCT/JP2005/009552
§ 371 (c)(1),
(2), (4) Date: Mar. 9, 2007

(87) PCT Pub. No.: WO2005/115663
PCT Pub. Date: Dec. 8, 2005

(65) Prior Publication Data
US 2007/0252309 A1 Nov. 1, 2007

(30) Foreign Application Priority Data
May 26, 2004 (JP) .............................. 2004-156941

(51) Int. Cl.
B22F 3/105 (2006.01)
B29C 35/08 (2006.01)
B29C 41/02 (2006.01)
B29C 41/52 (2006.01)

(52) U.S. Cl. ...................................... 264/408; 264/497

(58) Field of Classification Search ................. 264/40.1, 264/406, 408, 497
See application file for complete search history.

(56) References Cited

U.S. PATENT DOCUMENTS
6,483,596 B1   11/2002   Philippi et al.

(Continued)

FOREIGN PATENT DOCUMENTS
JP     8-318574     12/1996

(Continued)

OTHER PUBLICATIONS
English language Abstract of JP 2003-1715, Jan. 8, 2003.

(Continued)

*Primary Examiner*—Leo B Tentoni
(74) *Attorney, Agent, or Firm*—Greenblum & Bernstein, P.L.C.

(57) ABSTRACT

Prior to molding, an initial position of at least one movable reference mark, provided in the vicinity of an object of manufacture, is measured by a first position measuring means, and the initial position of the movable reference mark is measured by a second position measuring means provided in a processing means. During the course of molding, measurement of a position of the movable reference mark is carried out by the first position measuring means and the second position measuring means. Then, based on the initial position of the movable reference mark prior to molding and the position of the movable reference mark measured by the first and second position measuring means during the course of molding, an optical beam irradiating position of an optical beam and a processing position of the processing means are corrected.

5 Claims, 7 Drawing Sheets

U.S. PATENT DOCUMENTS

| | | |
|---|---|---|
| 6,657,155 B2 | 12/2003 | Abe et al. |
| 6,682,688 B1 | 1/2004 | Higashi et al. |
| 6,694,207 B2 | 2/2004 | Darrah et al. |
| 2002/0041818 A1 | 4/2002 | Abe et al. |
| 2003/0028278 A1 | 2/2003 | Darrah et al. |
| 2004/0148048 A1* | 7/2004 | Farnworth .................. 700/119 |
| 2006/0192322 A1 | 8/2006 | Abe et al. |
| 2006/0208396 A1 | 9/2006 | Abe et al. |

FOREIGN PATENT DOCUMENTS

| | | |
|---|---|---|
| JP | 2005-115004 | 4/2002 |
| JP | 2003-001714 | 1/2003 |
| JP | 2003-1715 | 1/2003 |
| JP | 2003-159755 | 6/2003 |
| JP | 2003-305778 | 10/2003 |
| WO | 01/36146 | 5/2001 |

OTHER PUBLICATIONS

English language Abstract of JP 8-318574, Dec. 3, 1996.

* cited by examiner

METHOD OF AND APPARATUS FOR MAKING A THREE-DIMENSIONAL OBJECT

TECHNICAL FIELD

The present invention relates to the art of making a three-dimensional object, in which an object of manufacture having any desired three-dimensional shape can be manufactured by cyclically irradiating a powdery layer with an optical beam to form a plurality of sintered layers which are laminated one above the other. More specifically, the present invention relates to a method of and an apparatus for making the three-dimensional object, in which during the trimming of a surface of the object being manufactured, the optical beam irradiating position and the trimming position at which the surface of the object is trimmed can be corrected.

BACKGROUND ART

The manufacture of a three-dimensional object is well known, which includes a cyclical execution of formation of a sintered layer by irradiating a powdery layer, formed on a molding table, with an optical beam (a directional energy beam such as, for example, a laser), and formation of a second sintered layer from a second powdery layer, then formed over the sintered layer so formed, by irradiating the second powdery layer with the optical beam, until the three-dimensional object of a desired size is eventually formed. It is known that during the course of formation of the three-dimensional object in the manner described above, the optical beam irradiating position is often displaced under the influence of, for example, displacement in the position of a light source with change in temperature and/or drift brought about by the temperature and humidity of an optical beam deflecting means even though the optical beam irradiating position is calibrated prior to the start of the process. Patent Document 1 discloses correction of the optical beam irradiating position to be made during the course of formation of the three-dimensional object.

Also, Patent Document 2 discloses successive execution of trimming of, and/or removal of unnecessary portions from, the surface of a laminated body made up of sintered layers laminated one above the other, during the course of formation of the three-dimensional object.

Patent Document 1: Japanese Laid-open Patent Publication No. 8-318574

Patent Document 2: Japanese Laid-open Patent Publication No. 2002-115004

DISCLOSURE OF THE INVENTION

Problems to be Solved by the Invention

However, in the manufacturing apparatus equipped with a processing means required to accomplish the removal of the unnecessary portions from the surface of the laminated body, a coordinate system associated with the optical beam irradiation and a coordinate system associated with the processing means must be matched with each other. It has also been found that the processing accuracy, with which the three-dimensional object is made, is largely affected not only by the displacement in the position of the optical beam irradiating position referred to above, but also by displacement in the cutting coordinate resulting from deformation of the machine brought about by heat evolved in a machine spindle, change in temperature of the environment, and the like.

Also, a similar displacement may occur when the molding table is heated to a substantial temperature under the influence of the irradiation of the high energy optical beam and/or heat evolved in the processing means during the removal of the unnecessary portions. In particular, once the molding table is displaced during the course of formation of the three-dimensional object, the displacement occurs in both of the optical beam irradiation position and the processing position of the processing means relative to those positions for a portion of the object being formed before those displacements take place.

The present invention has been devised with a view to substantially eliminating those problems inherent in the prior art techniques as discussed above and is to provide a method of and an apparatus for making a three-dimensional object, in which the displacement of the optical beam irradiating position and the displacement of the processing position of the processing means can be accurately corrected to eventually provide a highly precise object of manufacture.

Means to Solve the Problems

In accomplishing the above objective, the present invention provides a method of making an intended three-dimensional object of manufacture by irradiating a predetermined position of a powdery layer to form a sintered layer, irradiating a predetermined position of a second powdery layer, supplied onto the first sintered layer, to form a second sintered layer, and mechanically processing a surface of the sintered layers so formed, and is characterized by including measuring, prior to molding, an initial position of at least one movable reference mark provided in the vicinity of the object using a first position measuring means and the initial position of the movable reference mark using a second position measuring means provided in a processing means; measuring, during molding, a position of the movable reference mark and a position of the movable reference mark using the first position measuring means and the second position measuring means, respectively; and correcting an optical beam irradiating position of an optical beam and a processing position of the processing means using the initial position of the movable reference mark prior to molding and the positions of the movable reference mark measured by the first and second position measuring means during the course of molding.

Also, a position of a fixed reference mark spaced from the movable reference mark is measured by the first and second position measuring means prior to and during the course of molding, and based on a difference between the movable reference mark prior to molding and the fixed reference mark and a difference between the movable reference mark during the course of molding and the fixed reference mark, the optical beam irradiating position and the processing position of the processing means are corrected.

Correction of the optical beam irradiating position is preferably carried out for at least each layer and, on the other hand, correction of the processing position of the processing means is similarly preferably carried out for a plurality of layers.

The present invention also provides an apparatus for making an intended three-dimensional object of manufacture, which includes a molding table, a powdery layer forming means for supplying a powder onto the molding table to form a powdery layer, an optical beam irradiating means for irradiating an optical beam onto a predetermined location of the powdery layer, which has been formed by the powdery layer forming means, to sinter the powder at an optical beam irradiating position, and a processing means for performing a mechanical processing to a surface of a plurality of sintered layers formed by the optical beam irradiating means. This apparatus is characterized by including at least one movable reference mark provided in the vicinity of the molding table, a first position measuring means for measuring a position of the movable reference mark through an optical beam irradiating path, a second position measuring means provided in the processing means for measuring a position of the movable reference mark, and a control means for correcting an optical beam irradiating position and a processing position of the processing means using the respective positions of the movable reference mark measured by the first and second position measuring means prior to and during molding.

Also, the control means referred to above corrects the optical beam irradiating position, based on an amount of correction of the optical beam irradiating position obtained by measuring a beam irradiating trace of the optical beam irradiated onto a predetermined position.

Further, the three-dimensional object making apparatus may include at least one movable reference mark provided in the vicinity of the molding table, a first position measuring means for measuring a position of the movable reference mark and a position of an optical beam irradiating trace, irradiated towards a predetermined position, a second position measuring means for measuring a position of the movable reference mark provided in the processing means, and a control means for correcting an optical beam irradiating position and a processing position of the processing means on the basis of the respective positions of the movable reference marks measured by the first and second position measuring means prior to and during the course of molding.

In such case the second position measuring means may concurrently serve as the first position measuring means.

Also, a fixed reference mark may be provided outside the molding table in spaced relation to the movable reference mark, a position of which is measured by the first and second position measuring means, in which case the control means corrects the optical beam irradiating position and the processing positions, based on position information on the fixed reference mark obtained from the first and second position measuring means prior to and during the course of molding.

Preferably, the first position measuring means is moved into a path of travel of the optical beam being irradiated during measurement, but is retracted out of the path of travel of the optical beam during non-measurement.

Effects of the Invention

According to the present invention, displacement in position resulting from various causes such as, for example, thermal deformation of the molding table, thermal deformation or temperature drift of a scanning optics in an optical beam irradiating means and/or heat evolved in a main spindle of the processing means or any other deformation can be corrected to achieve an accurate formation of the three-dimensional object of manufacture.

EXPLANATION OF REFERENCE NUMERALS

2: Optical beam irradiating means 3: Processing means 4: Imaging Unit 5: Imaging means 6: Image processing device 7: Control device 9: Object to be formed 10: Chamber 11; Molding tank 12: Material tank 13: Molding table 14: Elevating table 16: Leveling blade 19: Beam transmitting window 20: Laser oscillator 21: Condensing lens 22: Scanner 23: Base 40: Imaging means 41: Reflecting mirror 42: Drive mechanism

BEST MODE FOR CARRYING OUT THE INVENTION

Hereinafter, the present invention will be described in detail with reference to the accompanying drawings in connection with a preferred embodiment thereof.

Figure 1:
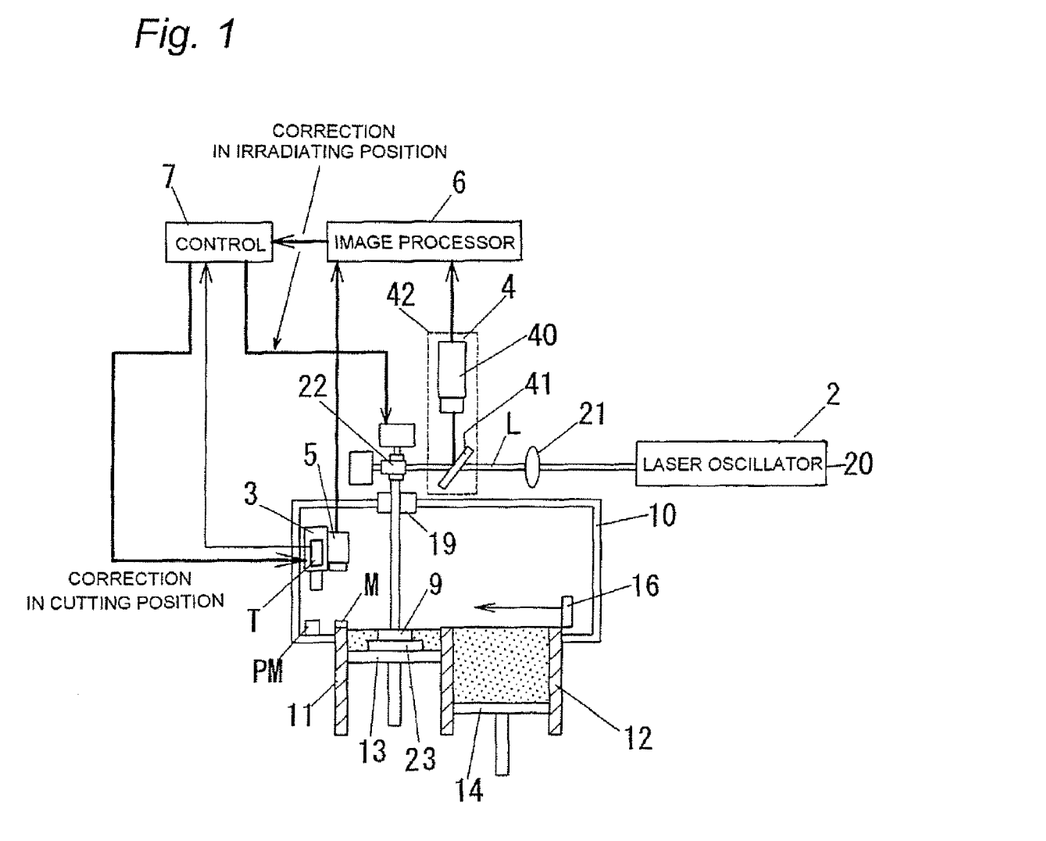
FIG. 1 is a schematic diagram showing an apparatus for making a three-dimensional object according to the present invention.

FIG. 1 illustrates an apparatus for making a three-dimensional object according to the present invention, which includes a chamber 10, the interior of which is filled with an inert gas such as, for example, nitrogen to render it to be held in an inactivated condition. A molding tank 11 and a material tank 12 are arranged at the bottom of the chamber 10, and a processing means 3 and a leveling blade 16 cooperable with the material tank 12 to form a powdery layer forming means are disposed inside the chamber 10. Within the molding tank 11, a molding table 13 capable of moving up and down inside the molding tank 11 is arranged and, similarly, an elevating table 14 capable of moving up and down is disposed inside the material tank 12.

A optical beam irradiating means 2 is arranged above the chamber 10 and includes a laser oscillator 20, a condensing lens 21 for converging an optical beam L outputted from the laser oscillator 20, and a scanner 22 in the form of a galvanometer for guiding the optical beam L, having passed through the condenser lens 21, towards the molding table 13 through a beam transmission window 19.

Figure 2A:
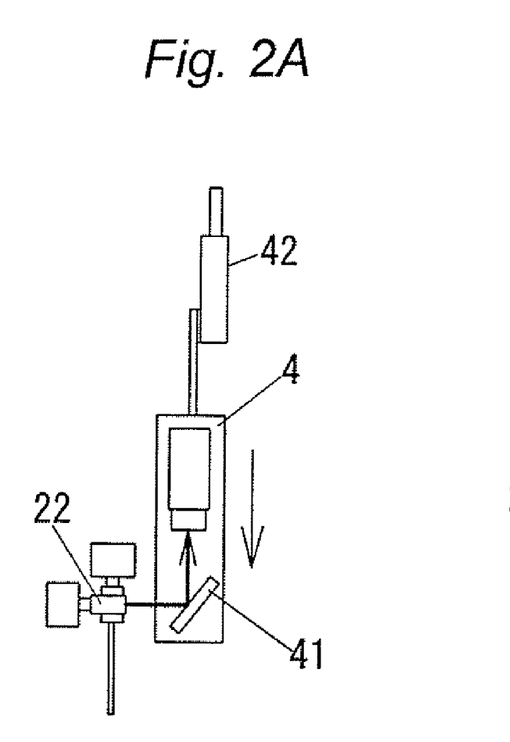
FIG. 2A is a schematic side view showing an operation of an imaging unit provided in the apparatus shown in FIG. 1.
Figure 2B:
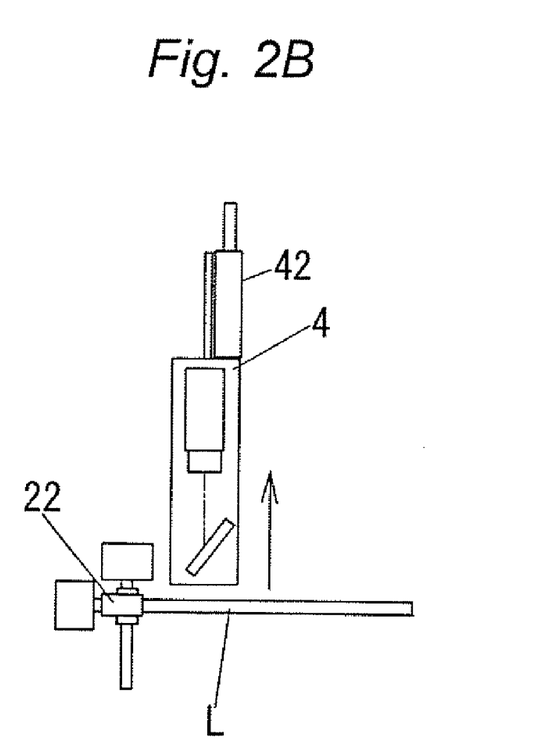
FIG. 2B is a schematic side view showing an operation of a modified form of the imaging unit.

An imaging unit 4 including a reflecting mirror 41, an imaging means 40 and a drive mechanism 42 such as, for example, a single-axis table for driving the reflecting mirror 41 and the imaging means 40 is disposed on the path of travel of the optical beam L and between the condensing lens 21 and the scanner 22. The imaging unit 4 forming a first position measuring means is retracted out of the optical path as shown in FIG. 2B when the optical beam L is being outputted to form a sintered layer, but is moved into the optical path as shown in FIG. 2A when a position displacement detection is carried out for the purpose of correction of a optical beam irradiating position for the optical beam L.

It is to be noted that in place of the reflecting mirror 41, a half mirror may be employed, in which case the half mirror is placed on the optical path at all times and, therefore, the use of the drive mechanism 42 can be dispensed with.

Figure 3A:
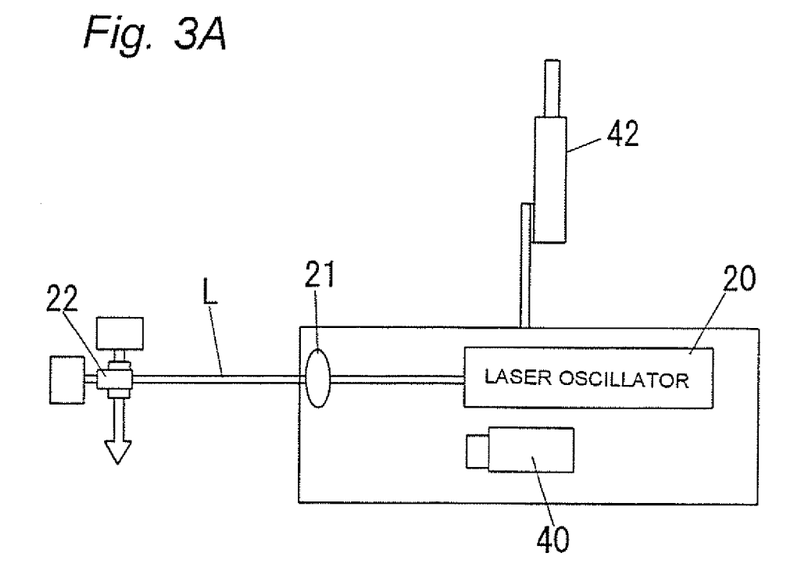
FIG. 3A is a schematic side view, showing an operation of a portion of a modified form of the apparatus shown in FIG. 1.
Figure 3B:
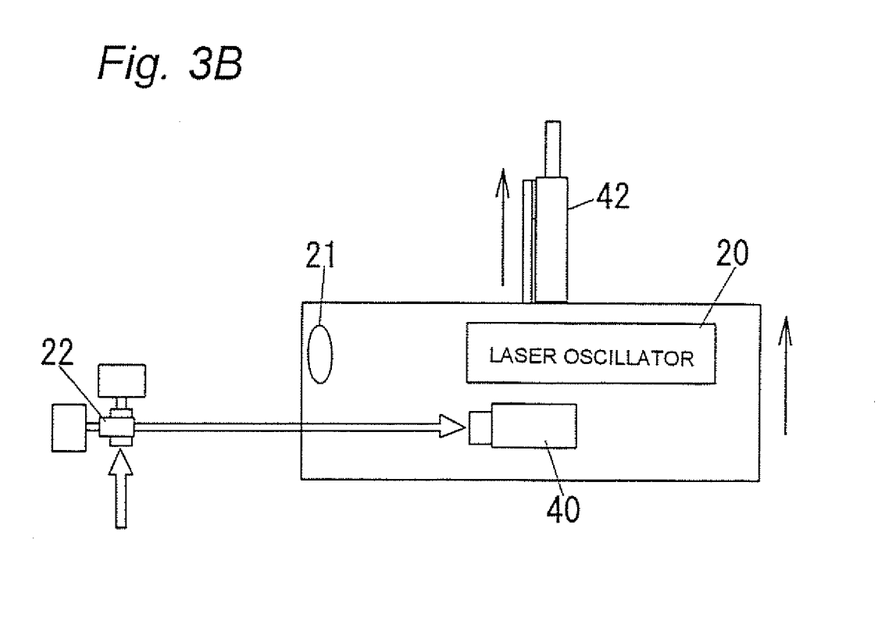
FIG. 3B is a schematic side view, showing another operation of the portion shown in FIG. 3A.

Alternatively, as shown in FIGS. 3A and 3B, the laser oscillator 20, the condensing lens 21 and the imaging means 40 may be mounted on a table that can be moved by the drive mechanism 42 so that the laser oscillator 20 and the condensing lens 21, or the imaging means 40 can be selectively brought into operation. In this case also, the use of the reflecting mirror 41 can be dispensed with.

The processing means 3 is utilized to trim a surface of an object 9, which is in the course of being formed while resting on the molding table 13 or which has been completed and may be a trimmer having a three-axis drive mechanism incorporated therein to enable trimming to be performed at one of a plurality of variable trimming positions. This processing means 3, that is, the trimmer also includes a spindle head on which the imaging means 5 forming a second position measuring means is mounted.

Respective image outputs from the imaging unit 4 and the imaging means 5 are supplied to an image processing device 6, which in turn performs an image processing to provide position information. This position information is supplied to a control device 7 for controlling the operation of the three-dimensional object manufacturing apparatus including the optical beam irradiating means 2 and the processing means 3.

In the three-dimensional object manufacturing device of the structure described above, a powdery metallic material that has been caused to overflow from the material tank 12 as the elevating table 14 is moved up is supplied onto a molding base surface, i.e., a top surface of the molding table 13 by means of a leveling blade 16 then driven in a direction perpendicular to the direction of elevation of the elevating table 14 and, at the same time, the powdery metallic material so supplied onto the molding base surface is leveled by the leveling blade 16 to thereby form a first powdery layer. A portion of this first powdery layer that is desired to be hardened is subsequently irradiated with the optical beam L so that the powdery metallic material forming the first powdery layer can be sintered to form a first sintered layer interlocked with a base 23.

Thereafter, the molding table 13 is lowered a predetermined distance and the elevating table 14 is again further moved up to supply the powdery metallic material in a manner similar to that described above. The powdery metallic material so supplied is then leveled by the leveling blade 16 to form a second powdery layer overlaying that portion of the first powdery layer, which has been hardened to form the first sintered layer, and the remaining portion of the first powdery layer. A portion of the second powdery layer that is desired to be hardened is subsequently irradiated with the optical beam L to form a second sintered layer interlocking with the first sintered layer situated therebelow.

Thus, by repeating a process of forming a powdery layer while the molding table 13 is lowered and forming a sintered layer in a required portion of the powdery layer by irradiation of the optical beam L, an intended three-dimensional object can be manufactured in the form of a laminated body of the sintered layers.

The path of travel of the optical beam L is defined by three-dimensional CAD (computer-aided design) data on the object of manufacture desired to be made. In other words, STL data generated from a three-dimensional CAD model are sliced at intervals of an equal pitch (for example, 0.05 mm pitch where the powdery layer has a thickness of 0.05 mm) to generate contour data for each section, which data are in turn subjected to an optical beam irradiating path generating process to thereby form optical beam irradiating path data. The optical beam irradiating path data so formed are, together with the contour data, inputted to the three-dimensional object making apparatus.

When while formation of the sintered layers, each through formation of the powdery layer and irradiation of the optical beam L, is successively repeated, the total thickness of the plural sintered layers attains a required value determined in dependence on the tool length of a trimming tool forming a part of the processing means 3, the processing means 3 is once activated to trim the surface (mainly a top side surface area) of the object molded up until that time. By way of example, if the trimming tool (a ball end mill) has a diameter of 1 mm, an effective blade length of 3 mm and a cutting depth of 3 mm and the powdery layer has a thickness of 0.05 mm, the processing means 3 is activated each time 60 or smaller sintered layers have been formed. By means of the trimming process performed by the processing means 3, the surface finish including removal by cutting of a low density surface layer resulting from deposition of powdery particles on the surface of the object being formed is carried out. The trimming path of the processing means 3, that is, the path of movement of the trimming tool is generated beforehand from the three-dimensional CAD data in a manner similar to the optical beam irradiating path for the optical beam L described above.

Since as hereinabove described, molding by irradiation of the optical beam and trimming by means of the processing means 3 are concurrently utilized, manufacture of the three-dimensional object with the apparatus of the present invention requires an initial position correction to be performed to render the coordinate system associated with the beam irradiation and the coordinate system for the processing means to be matched with each other. However, the present invention deals with detection of the amount of displacement in position and correction of such displacement which takes place after the initial position correction has been made. For this purpose, a movable reference mark M is provided at a predetermined position on the molding table 13 or the molding tank 11 enclosing the molding table 13 and, on the other hand, a fixed reference mark PM is provided at a portion of the chamber 10 encompassed within an area outside both of the molding tank 11 and the material tank 12 and capable of being imagewise captured by the imaging means 4 through the scanner 22 and also by the imaging means 5 mounted on the processing means 3. The fixed reference mark 22 is held at such a position that it will neither be thermally affected during the irradiation of the optical beam L and/or the processing by the processing means 3 nor be thermally affected by the molding table 13 if the latter is heated to elevated temperatures. It is to be noted that for each of the movable and fixed reference marks M and PM, a metallic block having a hole of about 1 mm in diameter defined therein is employed, but each may not be limited thereto.

The correction to be carried out in the three-dimensional object manufacturing apparatus of the structure shown in FIG. 1 will now be described with reference to a flowchart shown in FIG. 4 and also with reference to FIGS. 5 and 6.

Figure 4:
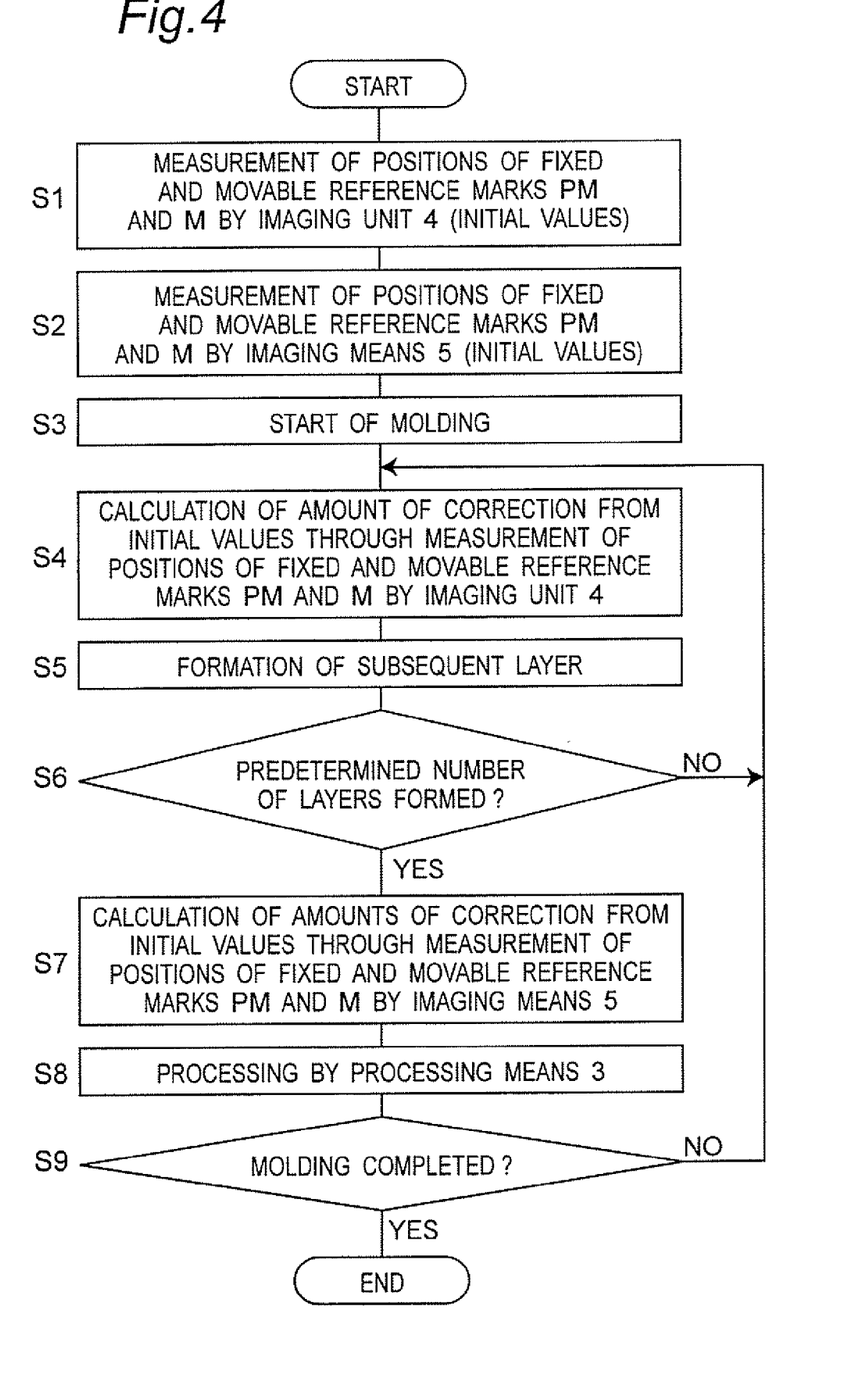
FIG. 4 is a flowchart showing a sequence of correction that takes place in the apparatus shown in FIG. 1.
Figure 5:
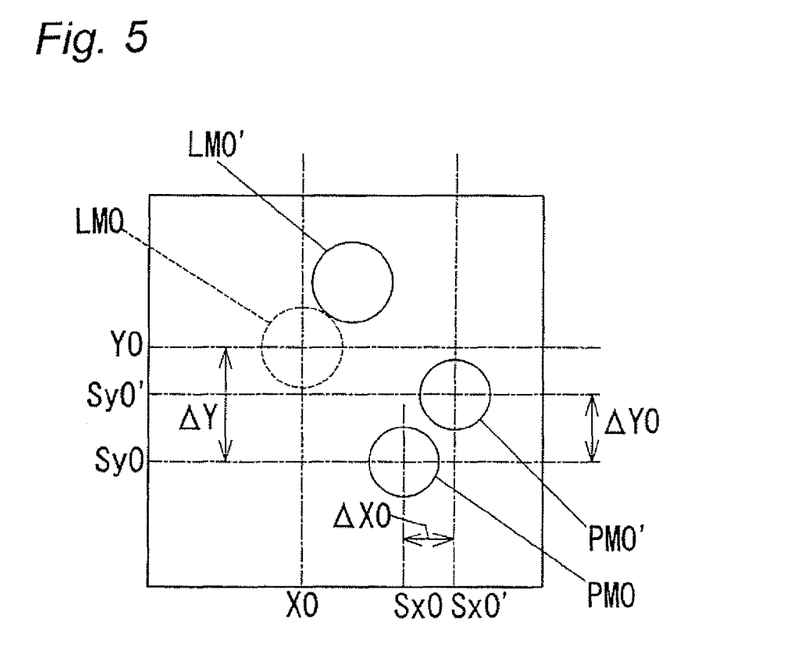
FIG. 5 is an explanatory diagram showing displacement between an irradiation spot of an optical beam and a fixed reference mark.
Figure 6:
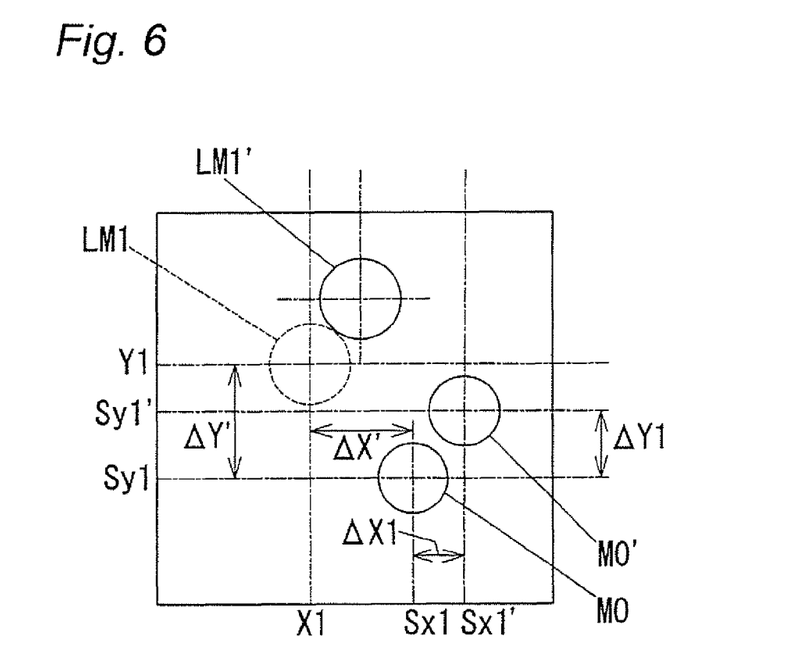
FIG. 6 is an explanatory diagram showing displacement between the irradiation spot of the optical beam and a movable reference mark.

At the outset of molding, and at step S1, the imaging unit 4 is moved into the optical path, and the fixed reference mark PM is captured by the imaging unit 4 while the scanner 22 is held at an angle (This angle (Gx0, Gy0) is determined beforehand.) sufficient to allow the fixed reference mark PM to fall within the field of view of the imaging unit 4, 50 that as shown in FIG. 5 the coordinates (Sx0, Sy0) of an image PM0 of the fixed reference mark PM within the image so obtained are determined by the image processing device 6. Similarly, the movable reference mark M is captured by the imaging unit 4 while the scanner 22 is held at an angle (This angle (Gx1, Gy1) is determined beforehand.) sufficient to allow the movable reference mark M to fall within the field of view of the imaging unit 4 so that as shown in FIG. 6, the coordinates (Sx1, Sy1) of an image M0 of the movable reference mark M within the image so captured is determined by the image processing device 6.

At the subsequent step S2, even in the imaging means 5 fitted to the processing means 3, the fixed reference mark PM is captured by the imaging means 5 while the fixed reference mark PM is held at a position (This position (Cx0, Cy0) is determined beforehand.) encompassed within the field of view of the imaging means 5, so that the coordinates (Tx0 Ty0) of an image PM0 of the fixed reference mark PM are determined by the image processing device 6. Similarly, the movable reference mark M is captured by the imaging means 5 while the movable reference mark M is held at a position (This position (Cx1, Cy1) is determined beforehand.) encompassed within the field of view of the imaging means 5' so that the coordinates (Tx1, Ty1) of an image M0 of the movable reference mark M are determined by the image processing device 6.

After the initial position has been determined in this way, formation of a first layer is initiated at step S3 and, then at step S4, the coordinates (Sx0', Sy0') of the fixed reference mark image PM0' and the coordinates (Sx1', Sy1') of the movable reference mark image M0' are determined while the scanner 22 is again set to the above described angles (Gx0, Gy0) and (Gx1, Gy1), and the difference (ΔX0, ΔY0) and difference (ΔX1, ΔY1) both with the initial value determined at step S1 are calculated and are used as respective correction amounts associated with the irradiation of the optical beam L.

After the optical beam irradiating position of the optical beam L has been corrected based on those correction amounts, a second layer is formed at step S5 and, at step S6, a decision is made to determine if formation over a predetermined number of times has completed. If the determination at step S6 indicates that formation over the predetermined number of times has not yet completed, the program flow returns to step S4, but if the determination at step S6 indicates that formation over the predetermined number of times has completed, the program flow goes to step S7.

It is to be noted that the term "predetermined number of times" referred to herein is limited to a value equal to or smaller than 60 in the case where a maximum number of 60 powdery layers each having a thickness of 0.05 mm can be processed by the processing means 3.

At step S7, the position coordinates (Tx0', Ty0') of the fixed reference mark image PM0' and the position coordinates (Tx1', Ty1') of the movable reference mark image M0' when the processing means 3 is set at the above described positions (Cx0, Cy0) and (Cx1, Cy1) are determined, and the difference with the initial value determined at step S2 is calculated as the amount of displacement of the processing position of the processing means 3, which is used as an correction amount associated with the processing.

After the processing position of the processing means 3 has been corrected based on this correction amount, the processing by the processing means 3 is carried out at step S8 and, at the subsequent step S9, a decision is made to determine if the entire formation has completed. If the determination at step S9 indicates that the entire formation has not yet completed, the program flow returns to step S4, but if the determination at step S9 indicates that the entire formation has completed, the program flow terminates.

It is to be noted that although in the flowchart shown in FIG. 4, the amount of displacement in position of the optical beam irradiating position of the optical beam L is corrected each time formation of a single layer completes, the amount of displacement of the irradiating position of the optical beam L may be calculated each time formation of a plurality of layers completes, so that the displacement in position can be corrected.

Also, the use may be made of a temperature measuring means T such as, for example, a thermocouple for measuring the temperature of the processing means 3 (the temperature or the like of a drive motor for the processing means 3), so that in the event that the temperature measured by the temperature measuring means T exceeds a predetermined value, the amount of displacement of the processing position of the processing means 3 can be calculated so that the displacement in position can be corrected.

Also, although in this embodiment the movable reference mark M has been shown and described as arranged in a peripheral edge of the molding tank 11, the movable reference mark M is preferably positioned as close to the object being formed as possible.

Also, the above described difference (ΔX0, ΔY0) represents a displacement in position resulting from the scanner 22; the difference (ΔX1, ΔY1) contains a displacement in position resulting from the scanner 22 and a displacement resulting from deformation of the molding tank 11; the difference between the respective coordinates (Tx0, Ty0) and (Tx0', Ty0') of the fixed reference mark images PM0 and PM0' represents a displacement in position of the processing means 3 resulting from heat evolved in the main spindle of the processing means 3; and the difference between the respective coordinates (Tx1, Ty1) and (Tx1', Ty1') of the movable reference mark images M0 and M0' contains thermal deformation of the processing means 3 and thermal deformation of the molding tank 11. Accordingly, the amount of displacement containing the various factors such as deformation and temperature drift of the scanner 22, thermal deformation on the side of the molding tank 11 and thermal deformation of the processing means 3 can be determined, and the molding can be accomplished without being affected by the displacement in position.

It is to be noted that more accurate detection of the amount of displacement in position and the associated correction can be accomplished if the movable reference mark M is provided not at a single location, but in a pair, in which the pair of the movable reference marks are disposed on, for example, a diagonal line of the molding tank 11 in spaced relation to each other and the respective positions are then measured.

It is also to be noted that since the foregoing correction is applicable where when the scanner 22 is set to the angles (Gx0, Gy0) and (Gx1, Gy1), the optical beam irradiating positions are brought in alignment with the respective positions of the fixed and movable reference marks PM and M, the optical axis of the optical beam L and the optical axis of the imaging unit 4 are aligned with each other in order to set this way. However, since this adjustment is not easy to accomplish and, in reality, somewhat displacement appears, this displacement is corrected at the time of the initial calibration, at which the coordinate system of the optical beam irradiating device 2 and that of the processing means 3 are aligned with each other. This correction can be accomplished based on the differences (ΔX, ΔY) and (ΔX', ΔY') between the coordinates (X0, Y0) and (X1,Y1) and the above described coordinates (Sx0, Sy0).

The above described difference necessary to accomplish the correction can be calculated by, while a beam irradiating trace forming member such as, for example, an acrylic plate or a heat sensitive paper is arranged in the vicinity of each of the fixed and movable reference marks PM and M and the scanner 22 is set at the above described angles (Gx0, Gy0) and (Gx1, Gy1), irradiating the optical beam L to form respective optical beam irradiating traces LM0 and LM1, then determining the coordinates (X0, Y0) and (X1, Y1) of the optical beam irradiating traces LM and M by imagewise processing images of the optical beam irradiating traces LM0 and LM1 through the imaging unit 4 while the scanner 22 is kept as set to the above described angles, and finally determining the differences ($\Delta X$, $\Delta Y$) and ($\Delta X'$, $\Delta Y'$) between the coordinates (X0, Y0) and (X1, Y1) and the above described coordinates (Sx0, Sy0). (See FIGS. 5 and 6.)

It is again to be noted that the beam irradiating trace forming member may be positioned at any location other than the neighborhood of the fixed and movable reference marks PM and M, provided that the relation between such location and the position of each of the fixed and movable reference marks PM and M is clear. Also, other than the acrylic plate and the heat sensitive paper, anything can be employed for the beam irradiating trace forming member, provided that it can be marked with the optical beam. By way of example, if an aluminum plate or iron plate having its surface painted with a white paint is used, the paint on the surface will be burned to form a blackened marking trace having a clear contrast. In addition, only an iron plate can be employed therefor.

Even during the course of molding, when the respective positions of the optical beam irradiating traces LM0' and LM1' at the time the optical beam is irradiated while the scanner 22 is set to the angles (Gx0, Gy0) and (Gx1, Gy1) are determined, any optical misalignment between the optical beam irradiating device 2 and the imaging unit 4 can be dealt with during the molding. The details of this correction will be described later.

In the meantime, as the foregoing description makes it clear, measurement of the fixed reference mark PM is not absolutely necessary and the correction may be made relying on the measurement of only the movable reference mark M. In such case, although the amount of displacement resulting solely from the scanner 22 and the amount of displacement solely resulting from thermal deformation of the processing means 3 cannot be determined, determination of the coordinates of the movable reference mark M is effective to accomplish the correction containing deformation of the scanner 3 and thermal deformation of the processing means 3 resulting from heat evolved in the main spindle (i.e., the correction of displacement in position of the scanner 22 and the processing means 3 relative to the object being molded). Also, even where the correction is made relying on the measurement of the movable reference mark M, the correction based on the difference ($\Delta X'$, $\Delta Y'$), obtained by the measurement of the movable reference mark M and the optical beam irradiating trace LM1, is quite naturally applicable.

In summary, the amount of correction of the processing position of the processing means 3 can be determined by determining the amount of correction of the optical beam irradiating position by imagewise capturing, by means of the imaging unit 4, both of the movable reference mark M and the optical beam irradiating trace LM1, formed by irradiating the optical beam L to the movable reference mark M, before the processing or during the course of the object being molded, and then by imagewise capturing the position of the movable reference mark M by means of the imaging means 5 before the processing and during the course of the object being molded.

Also, although reference has been made to the determination of the amount of displacement, that is necessary for the correction of the optical beam irradiating device 2, with reference to the image captured by the imaging unit 4, the imaging unit 4 may not be always essential particularly where the optical beam irradiating trace LM is formed by irradiating the optical beam L while the scanner 22 is set to the angles (Gx0, Gy0) and (Gx1, Gy1). This is because the correction of the optical beam irradiating device 2 can be accomplished when the optical beam irradiating trace LM and the movable reference mark M are imagewise captured by the imaging means 5 fitted to the trimming means 3 before and during the course of molding to determine the amount of displacement in position from the coordinates so captured. In such case, in order to remove influences brought about by thermal deformation of the processing means 3, using the amount of correction obtained for the purpose of correcting the optical beam irradiating device 2, the capturing of the coordinates of the fixed reference mark PM by means of the imaging means 5 is essentially required.

More specifically, by measuring the initial position of the movable reference mark M by means of the imaging means 5, and irradiating the optical beam onto a predetermined position of the beam irradiating trace forming member disposed in the vicinity of the movable reference mark M, the optical beam irradiating trace is measured by the imaging means 5 as an initial position. After this measurement, the position of the movable reference mark M and that of the optical beam irradiating trace have to be measured by the imaging means 5 each time the single layer is formed so that the correction of the optical beam irradiating device 2 can be accomplished. In such case, it occurs that since a plurality of optical beam irradiating traces are formed in the beam irradiating trace forming member, the optical beam irradiating traces may overlap one above the other if the beam is irradiated onto the same positions and, accordingly, the optical beam irradiating positions have to be spaced a predetermined pitch in one direction or two directions perpendicular to each other and, at the same time, the imaging means 5 has to be similarly shifted the predetermined pitch.

In the foregoing description, reference is made to the use of one movable reference mark M and one fixed reference mark PM, but a plurality of movable reference marks M may be employed as described previously. A similar description is equally applicable to the fixed reference mark PM. Hereinafter, the correction that is effected with the use of one fixed reference mark PM and two movable reference marks M will be specifically described.

Figure 7:
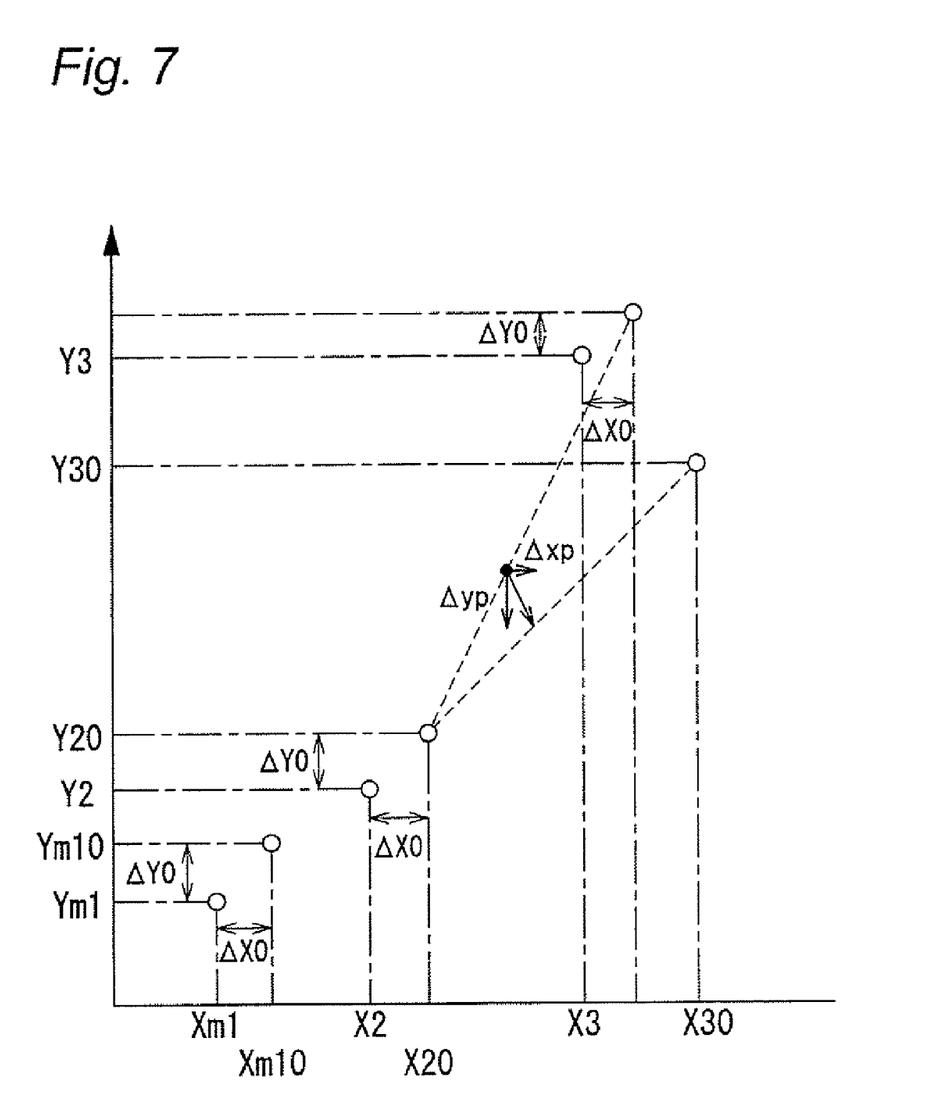
FIG. 7 is an explanatory diagram showing displacement between the fixed reference mark and movable reference marks, which is applicable where two movable reference marks are employed.

Assuming that as shown in FIG. 7, the positions of the fixed reference mark PM occupied before and during the course of molding lie at (Xm1, Ym1) and (Xm10, Ym10), respectively; the positions of the first movable reference mark M occupied before and during the course of molding lie at (X2, Y2) and (X20, Y20); and the positions of the second movable reference mark M occupied before and during the course of molding lie at (X3, Y3) and (X30, Y30), the position of the first movable reference mark M and the position of the second movable reference mark M are parallel moved only respective values of $\Delta X0 = Xm1 - Xm10$ and $\Delta Y0 = Ym1 - Ym10$, which are determined from the position of the fixed reference mark PM, to determine the origin of the spindle. In other words, $X2' = X2 + \Delta X0$, $Y2' = Y2 + \Delta Y0$, $X3' = X3 + \Delta X0$, and $Y3' = Y3 + \Delta Y0$ are determined and, also the differences $\Delta X2$, $\Delta Y2$, $\Delta X3$ and $\Delta Y3$ ($\Delta X2 = X2' - X20$, $\Delta Y2 = Y2' - Y20$, $\Delta X3 = X3' - X30$, and $\Delta Y3=Y3'-Y30$) between the position of the first movable reference mark M and the initial position thereof and between the position of the second movable reference mark M and the initial position thereof are determined.

Then, components of parallel movement $\Delta xp=(\Delta X2+\Delta X3)/2$ and $\Delta yp=(\Delta Y2+\Delta Y3)/2$ as offset correction values are determined; components of scaling $Lx0=X20-X30$, $Ly0=Y20-Y30$, $Lx=X2'-X3'$ and $Ly=Y2'-Y3'$ are determined; a gain correction scale factor $Kx=Lx/Lx0$ with respect to the X-axis and a gain correction scale factor $Ky=Ly/Ly0$ with respect to the Y-axis are determined. Then, the optical beam is irradiated with the optical beam irradiating position being displaced ($\Delta xp$, $\Delta yp$) and multiplied by ($Kx$, $Ky$).

It is to be noted that the correction applicable where only one movable reference mark M and only one fixed reference mark PM are employed suffices to be a process of displacing the position by a quantity corresponding to the determined amount of correction.

Figure 8:
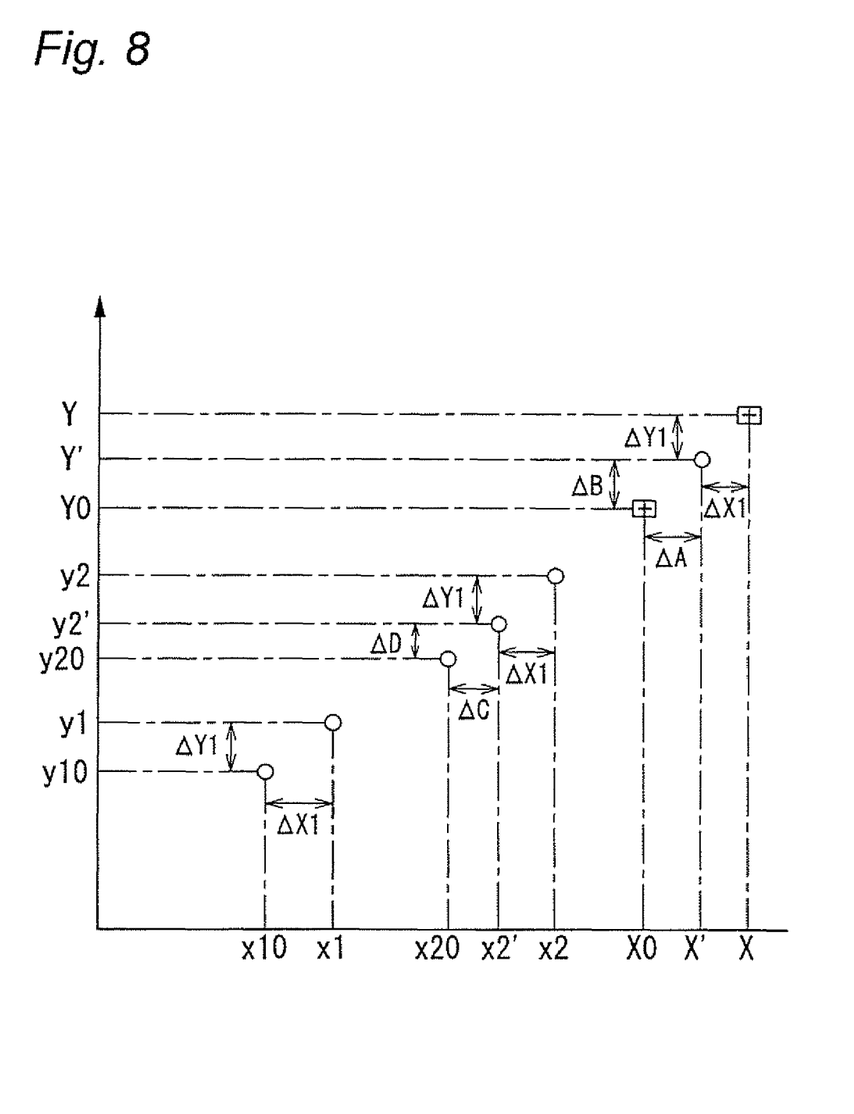
FIG. 8 is an explanatory chart showing how to determine the displacement between the movable reference mark and the fixed reference mark with the use of the irradiation spot of the optical beam.

In the following description, the manner in which the correction is carried out by the utilization of the optical beam irradiating traces and the imaging means 5 in the processing means 3, not the imaging unit 4, will be described in detail with reference to FIG. 8. In the condition in which the trimming coordinate system and the optical beam irradiating coordinate system are matched with each other, the fixed reference mark PM and the movable reference mark M are imagewise captured by the imaging means 5 and the respective positions are then determined by means of the image processing. The respective positions (x10, y10) and (x20, y20) of the fixed reference mark PM and the movable reference mark M so determined represent an initial value of the trimming coordinate system.

Then, the optical beam irradiating trace LM0 is formed by irradiating the optical beam L while the beam irradiating trace forming member has been held at a predetermined position, and the imaging means 5 is moved to the previously described predetermined position to measure the position (x0, y0) of the optical beam irradiating trace LM0.

Thereafter, during the course of molding, the respective positions of the fixed reference mark PM and the movable reference mark M are again measured by the imaging means 5. At this time, the position of the fixed reference mark PM is defined as (x1, y1) and the position of the movable reference mark M is defined as (x2, y2).

Also, the optical beam irradiating trace LM0 is formed by irradiating the optical beam L while the beam irradiating trace forming member is again held at the predetermined position, and the imaging means 5 is moved to the previously described predetermined to measure the position (X, Y) of the optical beam irradiating trace LM0.

The amount of correction is calculated in the manner which will now be described. At the outset, the amount of displacement $\Delta X1=x1-x10$ and $\Delta Y1=y1-y10$ of the fixed reference mark PM from the initial position is determined, and the respective positions of X and Y referred to above and the position of the movable reference mark M are then shifted with the use of these values. In other words, $X'=X+\Delta X1$, $Y'=Y+\Delta Y1$, $x2'=x2+\Delta X1$ and $y2'=y2+\Delta Y1$ are determined.

Also, the differences $\Delta A=X'-X0$ and $\Delta B=Y'-Y0$ with the initial value are determined to provide the respective amounts of correction to be made only to the optical beam irradiating system.

Again, by adding a component of variation of the movable reference mark M, the amounts of correction $\Delta C=x2'-x20$ and $\Delta D=y2'-y20$ to be made to the trimming system are determined.

The amounts of correction of the optical beam including the variation of the movable reference mark M represents $\Delta A+\Delta C$ and $\Delta B+\Delta C$.

INDUSTRIAL APPLICABILITY

The method of and the apparatus for making the three-dimensional object according to the present invention are useful in manufacturing a highly precise object of manufacture since displacement in the irradiating position of the optical beam and displacement in the processing position of the processing means can be accurately corrected.

The invention claimed is:

1. A method of making an intended three-dimensional object of manufacture by irradiating a predetermined position of a first powdery layer to form a first sintered layer, irradiating a predetermined position of a second powdery layer, supplied onto the first sintered layer, to form a second sintered layer, and mechanically processing a surface of the sintered layers so formed, said method comprising:

measuring, prior to molding, an initial position of at least one movable reference mark provided in the vicinity of the object using a first position measurer and the initial position of the movable reference mark using a second position measurer provided in a processor;

measuring, during molding, a position of the movable reference mark and a position of the movable reference mark using the first position measurer and the second position measurer, respectively; and correcting an optical beam irradiating position of an optical beam and a processing position of the processor using the initial position of the movable reference mark prior to molding and the positions of the movable reference mark measured by the first and second position measurer during the course of molding.

2. The three-dimensional object making method as claimed in claim 1, further comprising:

measuring a position of a fixed reference mark spaced from the movable reference mark using the first and second position measurer prior to and during the course of molding; and correcting the optical beam irradiating position of the optical beam and the processing position of the processor using a difference between the movable reference mark prior to molding and the fixed reference mark and a difference between the movable reference mark during the course of molding and the fixed reference mark.

3. The three-dimensional object making method as claimed in claim 1, wherein correction of the optical beam irradiating position of the optical beam is carried out for at least each layer.

4. The three-dimensional object making method as claimed in claim 1, wherein correction of the processing position of the processor is carried out for a plurality of layers.

5. The three-dimensional object making method as claims in claim 1, wherein the position of the movable reference mark as measured during molding differs from the initial position.

* * * * *

UNITED STATES PATENT AND TRADEMARK OFFICE
CERTIFICATE OF CORRECTION

PATENT NO. : 7,867,431 B2
APPLICATION NO. : 11/569261
DATED : January 11, 2011
INVENTOR(S) : Y. Higashi et al.

It is certified that error appears in the above-identified patent and that said Letters Patent is hereby corrected as shown below:

On the Title Page, under Item (73) Assignees, "Matsuura Machinery Corporation, Fukui (JP); Panasonic Electric Works Co., Ltd., Osaka (JP)" should read --Panasonic Electric Works Co., Ltd., Osaka (JP); Matsuura Machinery Corporation, Fukui (JP)--.

On Title Page 2, under Item (56) References Cited, FOREIGN PATENT DOCUMENTS, "JP 2005-115004 4/2002" should read --JP 2002-115004 4/2002--.

Signed and Sealed this
Thirteenth Day of September, 2011

David J. Kappos
*Director of the United States Patent and Trademark Office*